July 9, 1968  C. H. GARDNER ET AL  3,391,961
PNEUMATIC SEAT BELT
Filed Jan. 16, 1967  3 Sheets-Sheet 1

INVENTORS
CLAYTON H. GARDNER
BRUCE R. VOGELI
BY
Herbert Smith Sylvester
ATTORNEY

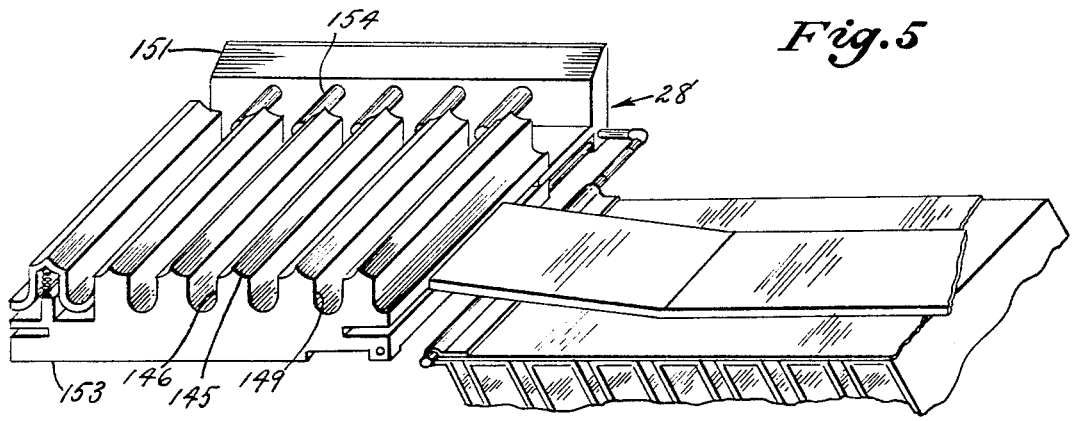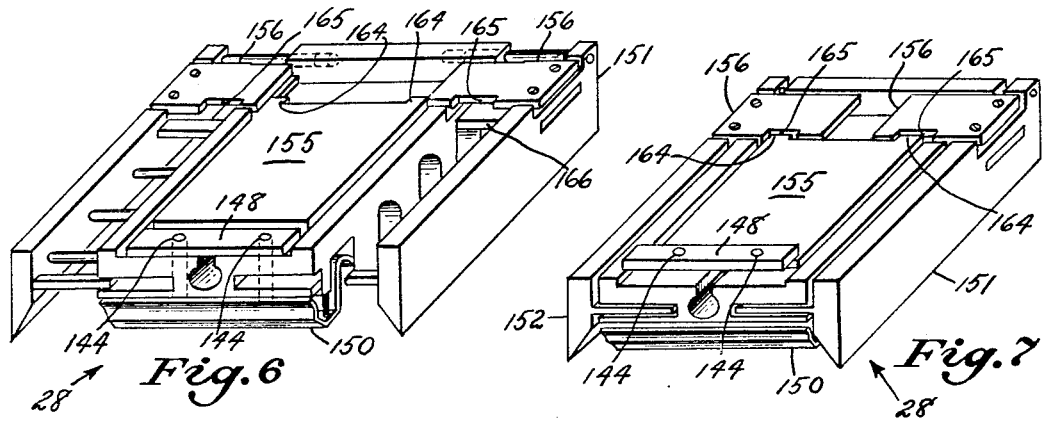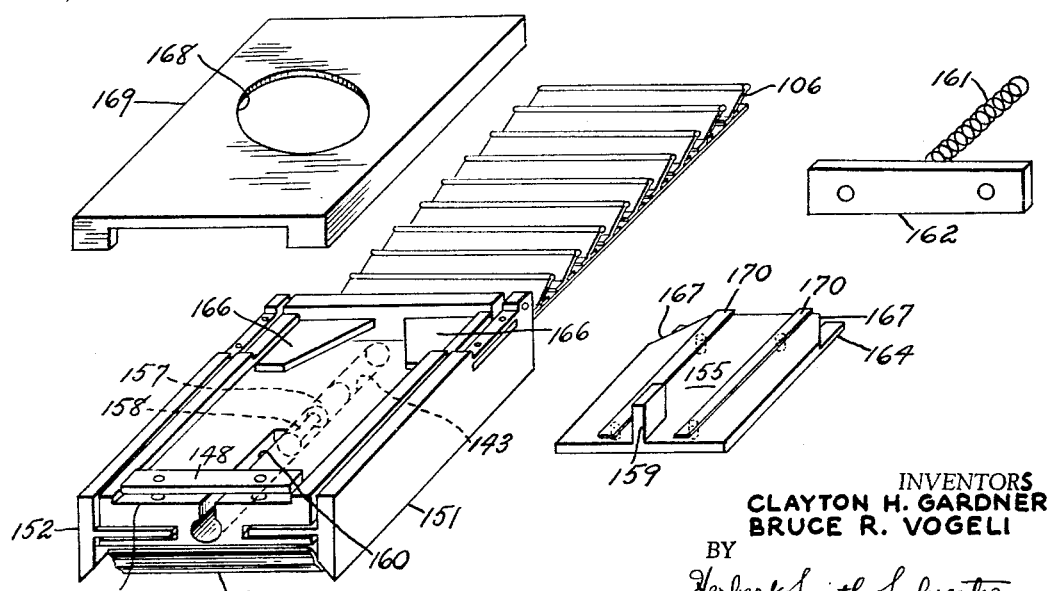

United States Patent Office 3,391,961
Patented July 9, 1968

3,391,961
PNEUMATIC SEAT BELT
Clayton H. Gardner, 37 Girard Ave., Chatham, N.J. 07928, and Bruce R. Vogeli, 2 Hamilton Road, Apt. 5N, Morristown, N.J. 07960
Filed Jan. 16, 1967, Ser. No. 609,566
10 Claims. (Cl. 297—388)

ABSTRACT OF THE DISCLOSURE

A seat belt is disclosed which is automatically extended from a retracted position to envelope the body of a person to be confined when the weight of such person is applied to the seat. A pneumatically operated buckle for engaging the seat belt is also disclosed.

---

This invention relates to an automatically applied seat belt.

In accordance with the present invention, an automatically applied seat belt comprises two engageable belt portions each biased to a normally retracted condition by retracting means, pneumatically inflatable chambers in said belt portions for erecting said portions into overlapping relationship over the body of a person to be confined therein, said belt portions when erected having an arcuate shape lengthwise which approximates the body curve of a person seated thereunder, means on said overlapping belt portions for engaging each other, means for deflating without disengaging said belt portions after engagement thereof, and manually operated means for disengaging said engaged portions to permit release of a person confined thereby and retraction of said belt portions by said retracting means.

Various features and advantages of this invention will be apparent from the following detailed description and appended claims and the accompanying drawings.

In the drawings:

FIG. 5 is a view of the underside and rear of an automatically locking buckle suitable for use on the instant seat belt, the buckle being illustrated with the top, one side and front plate of the buckle removed;

FIG. 6 is a view of the top and front (with cover plate and front plate removed) of the buckle of FIG. 5;

FIG. 7 is a view of the top and front of the buckle of FIG. 5 (with cover and front plate removed) with the buckle in fastened and locked condition; and FIG. 8 is a view of the top and front of the buckle of FIG. 5 with certain parts isolated to show details of the internal construction of the buckle.

Figure 1:
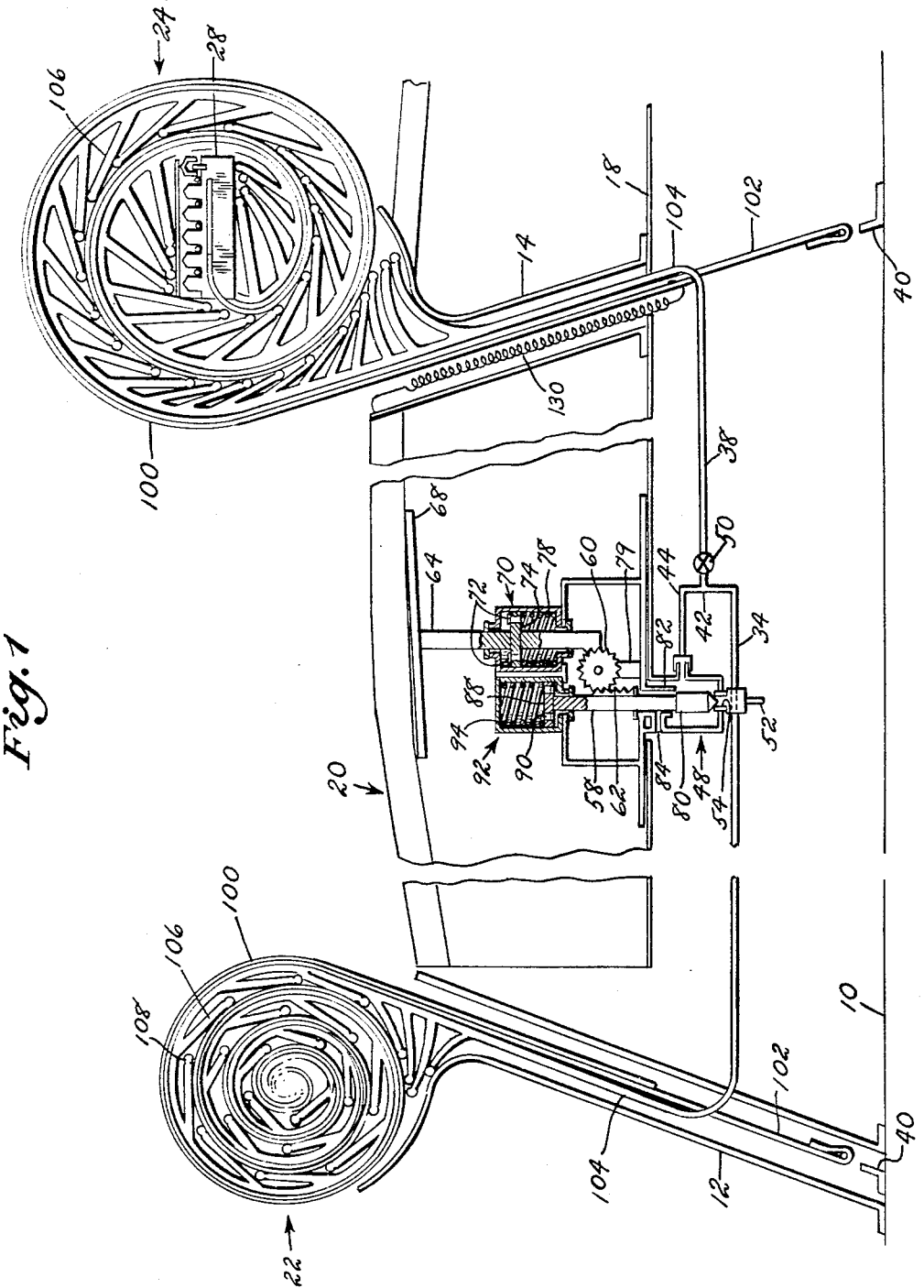
FIG. 1 is a view (not to scale) in cross-section of a portion of a vehicle seat on which a pneumatic seat belt of the instant invention is shown mounted in uninflated, retracted condition.

Referring now to FIG. 1, a vehicle seat 20 is supported in the customary manner on the floor 10 of a vehicle. Affixed to the floor 10 of the vehicle is a left tubular support guide 12. A right tubular support guide 14 is affixed to the base 18 of the seat 20. The left and right tubular support guides 12 and 14 contain, respectively, segments of a left seat belt portion 22 and a right seat belt portion 24, the free ends of which are illustrated in coiled or retracted condition. The two seat belt portions 22 and 24 are similar in their construction, however the right seat belt portion 24 terminates in a buckle 28 which, as will be further described hereinafter, engages positively any portion of the left seat belt portion 22 which it overlaps during use.

The anchored ends of the left and right seat belt portions 22 and 24 are affixed to floor brackets 40 which are bolted or welded to the floor 10 of the vehicle, and the free ends are coiled in retracted condition as shown in FIG. 1 by ribbon springs 100. The seat belt portions are connected to left and right air lines 34 and 38 for inflating each pneumatic seat belt portion.

The air lines 34 and 38 merge at a T 42, from which a common line 44 enters an inflation control valve housing 48. A restrictive orifice 50 is disposed in the line 38 which supplies the buckle-bearing right seat belt portion 24, but the air line 34 to the left seat belt portion 22 is unrestricted.

The inflation control valve housing 48 is supplied with compressed air from a source (not illustrated) such as a spare tire, a tank in the trunk of the vehicle that can be refilled at a filling station, or from a compressor powered by the vehicle engine, through a supply line 52. Compressed air from the supply line 52 passes through a valve seat 54 when a vertically reciprocating valve stem 58 is lifted by rotation of an idler pinion gear 60 which engages a rack 62 formed on one side of the valve stem 58 and a toothed shaft 64.

The toothed shaft 64 is attached to the under side of a platform 68 disposed under the upper surface of the seat 20 such that the platform 68 and shaft 64 are depressed by the weight of a passenger on the upper surface of the seat 20.

When the shaft 64 is depressed by the weight of a passenger on the seat above the platform 68, the toothed portion of the shaft 64 rotates the pinion gear 60 as the shaft 64 lowers, however inasmuch as the toothed segment of the shaft 64 is relatively short, after initial rotation of the pinion gear 60 by passage of the toothed segment of the shaft 64 thereby, the toothed segment of the shaft is disposed entirely below the pinion gear 60, such that bouncing of the passenger sitting on the vehicle seat 20 does not turn the pinion gear 60 (thereby avoiding intermittent operation of the inflation control valve within the housing 48).

The shaft 64 passes through a hydraulic damping chamber 70. The damping chamber contains a hydraulic fluid which, during downward motion of the shaft 64, passes freely upwardly through a pair of check valves 72 in a piston head 74 which is carired by the toothed shaft 64. The check valves 72 are not completely liquid tight, and permit the piston head 74 to return slowly to the position of normal bias illustrated in FIG. 1 under the urging of a biasing spring 78 when the passenger's weight is removed from the seat 20, thus returning the shaft 64 and platform 68 to their normal elevated positions. In addition, the mount 79 holding the shaft upon which pinion gear 60 rotates is spring biased downwardly onto an upwardly projecting internal support (not illustrated). This mount 79 can move upward against the spring biasing as the teeth on shaft 64 engage the teeth on pinion gear 60 during upward movement of shaft 64. Thus, shaft 64 can return to the position shown without moving shaft 58.

The valve stem 58 is formed with an enlarged sealing head 80 which, on elevation of the shaft 58, withdraws from the valve seat 54 and enters a casing 82 which has therein a side vent 84. When the enlarged head 80 is in the casing (i.e., while the shaft 58 is in its elevated position) the vent 84 is closed, thus permitting air from the supply line 52 to pass through the valve seat 54 and into the line 44 leading to the supply lines 34 and 38.

The upper end of the vertically reciprocating valve stem 58 carries a flanged piston head 88 which is housed within a chamber 92. The flanged piston head 88 has therein check valves 90 which permit hydraulic fluid to pass freely therethrough when the flanged piston head 88 is elevating, but which close to permit only slow downward passage of the flanged piston head 88 and valve stem 58 under the pressure of a return spring 94. Thus, when the teeth on the bottom portion of the shaft 64 no longer engage the pinion gear 60 (because the weight of a passenger of the seat 20 has driven the toothed portion of the shaft 64 below engagement with the pinion gear) the return spring 94 gradually returns the valve stem 58 to the normally closed position illustrated in FIG. 1. This slow return allows enough time for inflation and fastening of the belt. When the valve stem 58 is completely returned, vent 84 is opened and the compressed air with which the belt portions 22 and 24 have been inflated escapes through the vent 84 via the air lines 34, 38 and 44, thus permitting the belt portions to deflate themselves after they have been erected (and locked together).

Figure 2:
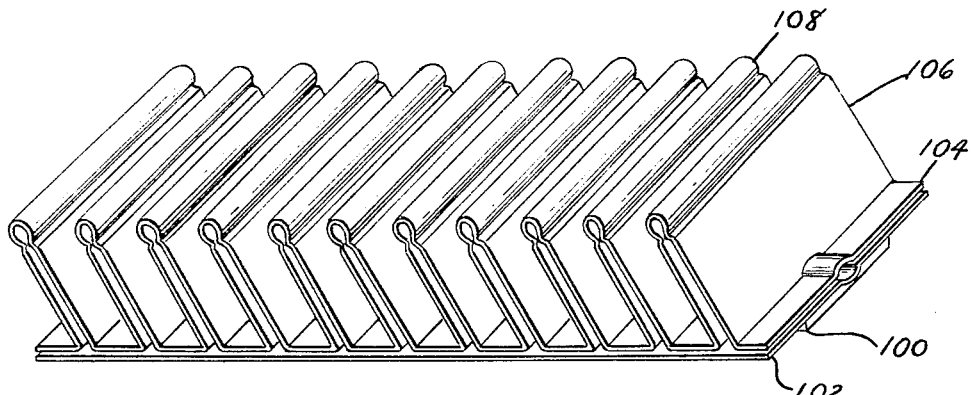
FIG. 2 illustrates a segment of the instant pneumatic seat belt as it would appear if unrolled manually.
Figure 3:
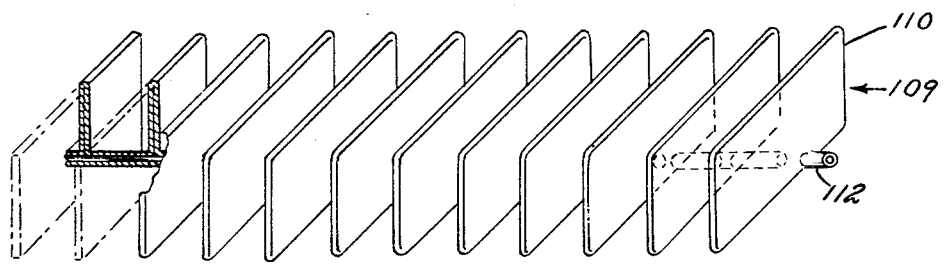
FIG. 3 shows a segment of the pneumatic bladder employed in the instant seat belt.
Figure 4:
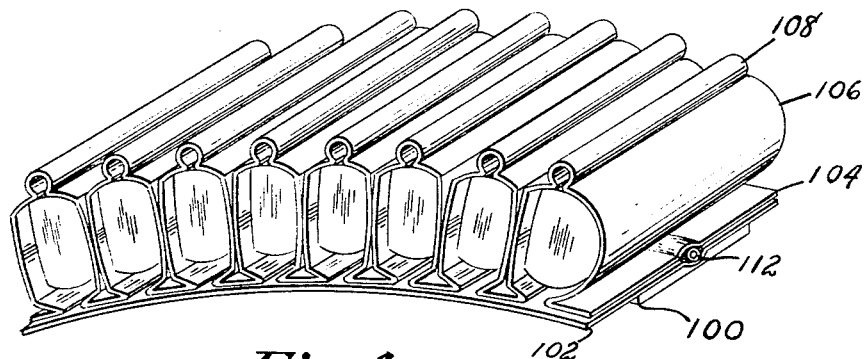
FIG. 4 illustrates a segment of the instant seat belt with the bladder in place and inflated.

Details of the construction of the belt portions 22 and 24 are best seen in FIGS. 2, 3 and 4.

The belt portions comprise a coil spring 100 applied to a continuous flexible backing 102. Securely fastened to the backing 102 is a facing layer 104 which is sewn or otherwise fabricated into a series of adjacent pockets 106 running transversely to the belt. The outwardly projecting edge of each pocket is formed over a mandrel into a rigid hollow cylindrical tube 108.

A bladder 109 composed of a series of inflatable bladder segments 110 is disposed within the pockets 106 of the belt portions 22 and 24. An air duct 112 runs lengthwise of the belt between the backing layer 102 and the facing layer 104, connecting in series each of the bladder segments 106. As is particularly illustrated in FIG. 4, when the entire bladder is inflated through the air duct 112, the pockets 106 erect and impinge on each other, thereby forming an inflated belt of generally arcuate form (which adapts to the shape of a passenger seated thereunder) and of substantially rectangular cross-section from which an evenly spaced series of regular rigid hollow cylindrical tubes 108 are prominently outwardly projected.

When a belt portion 22, 24 is coiled into its normally retracted configuration, as illustrated in FIG. 1, the duct 112 is folded and effectively crimped between each successive bladder segment 110 with the result that when air is delivered to the duct 112, each bladder segment 110 substantially inflates before the crimp in the air duct 112 next adjacent thereto towards the free end of the belt portion involved is unfolded and opened to permit inflation of the next adjacent pocket. This serial inflation of the pockets 106 by the bladder segments 110 forces the belt to uncoil and to lie snugly against the lap of a passenger to be restrained thereby.

Inflation of both belt portions 22 and 24 is not simultaneous. The orifice 50 retards entrance of air into the line 38 leading to the belt portion 24 on which the buckle 28 is carried, with the result that the left seat belt portion 22 is inflated and positioned before the right seat belt portion 24.

The air duct 112 of each seat belt portion 22, 24 is, of course, connected at one end to the appropriate air supply line 34, 38. At the free end of the left belt portion 22, the air duct 112 is sealed shut. The air duct 112 in the right belt portion 24 is fitted to the buckle 28 and supplies air thereto.

A tension spring 130 is provided for automatic adjustment of the belt position when the seat 20 is moved back or forth or up or down. Together with the coil spring 100, it maintains the right belt portion 24 in tension against its bracket 40.

The buckle, indicated generally by reference character 28, is disposed at the free end of the right belt portion 24. It is designed to mate with and engage positively any portion of the left belt portion 22 which it overlies.

As the right belt portion 24 falls onto the already uncoiled left belt portion 22, the upstanding rigid hollow cylindrical tubes 108 on the left belt portion are guided into slots 149 in the belt buckle by tapered projecting surfaces 145 on the walls 146 which define the slots 149. Pressure of that cylindrical tube which happens to bear on a trigger 150 at the free end of the buckle actuates the sides 151 and 152 of the buckle, causing them to be drawn towards the body 153 of the buckle. The sides 151 and 152 carry projecting pins 154 which enter and engage hollow cylindrical tubes 108 upstanding on the left belt portion 22, thereby securely fastening the belt halves together.

On the top side of the buckle 28 is a slider 155 which is in the position shown in FIG. 6 when the belt has been inflated but the trigger 150 has not yet been raised. The sides 151 and 152 are spring biased toward the body 153 of the buckle 28 by springs (not shown). However, flanges 156 project laterally from the sides 151 and 152 toward the body of the buckle 153 and bear against the sides of the slider 155 (when the slider 155 is in the position shown in FIG. 6). The sides 151 and 152 remain spread in this manner until the trigger 150 is raised. When the trigger 150 is raised due to pressure of the underlying portion of the belt thereon, a base plate 148 affixed to the trigger by two posts 144 is also raised, permitting the slider 155 to slide thereunder sufficiently to disengage from the lateral flanges 156, with the result that the sides 151 and 152 are urged by their spring biasing inwardly towards the buckle body 153 to assume the position shown in FIG. 7.

As shown by the dotted lines in FIG. 8 (from which the slider 155 is shown removed and inverted and where the lateral flanges 156 are removed) a compressed air-operated piston 157 having a piston rod 158 is nested within an air cylinder 143 in the body 153 of the buckle. (The air cylinder 143 terminates the air duct 112 in the right belt portion 24.) When the slider 155 is in place, a projecting tab 159 thereon fits loosely in a slot 160 in the body of the buckle 153. The piston rod 158 bears against the projecting tab 159 and, as the belt is inflated, compressed air enters the cylinder 143 through the air duct 112 (shown in FIG. 4, which ends therein) and pushes the piston 157, the rod 158 affixed thereto, and the slider 155, forward. A cylindrical biasing spring 161 held firmly in the base of the cylinder 143 by a front plate 162 tends to urge the slider 155 away from the front plate 162.

As noted previously, after the buckle 28 locks on to the underlying left belt portion 22, both belt portions 22 and 24 are deflated by venting through the vent 84 (shown in FIG. 1). When the air pressure within the right belt portion 24 is released, the air pressure on the piston 157 is removed, with the result that the biasing spring 161 moves the slider 155 toward the lateral flanges 156. As is best illustrated in FIG. 7, this rearward motion causes projecting ears 164 on the slider 155 to engage notches 165 on the flanges 156, thereby effectively locking the buckle 28 in the closed position.

The buckle side portions 151, 152 each carry an inwardly projecting tooth 166 whose inner end is diagonally cut. Each tooth 166 is directly beneath a flange 156 and vertically separated from the flange by approximately half the thickness of slider 155. As shown in FIG. 8, two corners 167 of the inner end of the under surface of the slider 155 are tapered to match the diagonally cut ends of the teeth 166. (The teeth 166 project into the body 153 of the buckle 28.) The taper-cut corners 167 are cut to a depth approximately equal to half the thickness of the slider thereby leaving ears 164 on the inner end of the upper surface of slider 155. The buckle is covered by a cover 169 having therein a hole 168 which exposes the center of the slider 155.

To open the buckle when it is locked, finger pressure is applied to the slider 155 through the hole 168. Spring biased runners 170 on the slider 155 normally maintain the slider 155 biased toward the cover 169, however when the slider 155 is depressed manually, the projecting ears 164 thereon slip beneath the flanges 156 but remain above the teeth 166 while the diagonally tapered corners 167 thereon are positioned between the similarly shaped ends of the teeth 166. The spring 161, which was compressed during the buckling operation, drives the slider 155 away from the front plate 162, and as the tapered corners 167 of the slider 155 wedge the teeth 166 apart, the sides 151 and 152 are moved away from the body 153 of the buckle and the pins 154 are withdrawn from the hollow cylinders 108 of the underlying belt portion. Once the pins 154 have disengaged from the underlying belt portion, the coil spring 100 in each belt portion causes coiling thereof, and both halves of the belt coil themselves and retract the belt into neat concentric coils that rest on the supports 12 and 14.

When the slider 155 has completed its path of travel, the lateral flanges 156 are spread fully and the slider 155 moves upward to a position between them under the urging of the spring biased runners 170. Thereafter the sides 151 and 152 are held in the fully opened position by the projecting ears 164 of the slider 155 until the next cycle of operation is initiated.

The preferred embodiment of the instant invention comprises two belt portions with buckle 28 on the free end of portion 24 and the hollow cylindrical tubes 108 on portion 22. In certain applications, it may be desirable to have the buckle mounted on a short length of seat belt of conventional design except for an air duct to supply pneumatic pressure for operating the buckle. In such an application, the seat belt portion 22 is longer than in the preferred embodiment. After portion 22 has erected, a passenger who wishes to be confined will push the buckle against the prominently outwardly projecting hollow cylindrical tubes 108 whereupon the projecting pins 154 on the buckle sides will engage the hollow cylindrical tubes as described earlier.

Although the preferred embodiment employs hollow cylindrical tubes 108 carried by a belt portion 22 and projecting pins 154 on the movable sides of the buckle 28, it is apparent that these could be reversed; that is, the hollow cylindrical tubes can be on the buckle sides and the projecting pins can be securely fastened to the tops of the inflatable pockets. Also, many various other means for fastening movable buckle sides to erecting inflatable pockets will be apparent to those skilled in the art.

As is apparent from the foregoing, the instant seat belt is applied automatically, it adapts itself to passengers of a variety of sizes and shapes, it buckles with a positive locking action, it deflates and thus relaxes slightly after closure, to insure a comfortable fit without opening or loosening unduly, it is unaffected by bumps or sudden changes of direction of the vehicle in which it is installed, it requires a deliberate, manual act to be opened, and it is self-retracting after it has been opened.

Although the instant embodiment contemplates a seat belt for the seat of a conventional automobile, it is to be recognized that the instant invention can be adapted for aircraft, buses, trains and the like, and that the buckle can be affixed to either portion of the belt as desired or, the buckle can be affixed to a short length of conventional seat belt material.

What is claimed is:

1. An automatically applied seat belt which comprises two engageable belt portions, retracting means which bias said belt portions to a normally retracted condition, a plurality of pneumatically inflatable chambers in said belt portions for erecting said belt portions into overlapping relationship over the body of a person to be confined therein, said seat belt portions when erected having an arcuate shape lengthwise which approximates the body curve of a person seated thereunder, means on said overlapping belt portions for engaging each other, means for deflating without disengaging said belt portions after engagement thereof, and manually operated means for disengaging said engaged portions to permit release of a person confined thereby and retraction of said seat belt portions by said retracting means.

2. A seat belt comprising retracting means which bias said belt to a normally coiled position, a plurality of pneumatic pockets disposed along the length of said belt in proximity to each other such that on inflation thereof each inflated pocket impinges on the inflated pocket next adjacent thereto along the length of said belt, said pockets being interconnected by a duct that extends substantially the entire length of said belt, said duct being pinched between successive pockets when said belt is coiled whereby each pocket is substantially inflated by pneumatic pressure applied through said duct before said duct is unpinched between such inflated pocket and the uninflated pocket next adjacent thereto, thereby causing inflation of said pockets to occur serially in sequential manner, said fully inflated belt having an arcuate shape which approximates the body curve of a person seated thereunder, means for inflating said belt, and means for deflating said belt thereby to permit recoiling of said belt by said retracting means.

3. A seat belt having coiling means which biases said belt to a normally coiled condition, a plurality of pneumatically inflatable chambers disposed transversely to the length of said belt for erecting said belt over the body of a person to be confined therein, said belt when erected having arcuate shape lengthwise which approximates the body curve of a person seated thereunder, means for fastening the free end of said belt, means for deflating said belt without unfastening its free end, and means for unfastening said free end to permit release of a person confined thereby and retraction of said belt by said coiling means.

4. An automatically applied seat belt as set forth in claim 1 having said chambers connected in series along a duct in each of said belt portions.

5. An automatically applied seat belt as set forth in claim 4 having a valve for admitting air to said duct, said valve being actuated by the weight of a person to be confined with said belt.

6. An automatically applied seat belt comprising two web belt portions each biased to a normally retracted condition, each portion having disposed along its length a plurality of pneumatic pockets disposed in proximity to each other such that on inflation thereof each inflated pocket impinges on the inflated pocket next adjacent thereto along the length of said belt portion, said pockets on each belt portion being interconnected by a duct which extends for substantially the entire length of that portion, said duct being pinched between successive pockets when said belt portions are retracted whereby each pocket is substantially inflated by pneumatic presure applied through said duct before said duct is unpinched between such inflated pocket and the uninflated pocket adjacent thereto, thereby causing inflation of said pockets to occur serially in sequential manner, said belt portions overlapping when fully inflated, said fully inflated belt portions having arcuate shapes lengthwise which approximates the body curves of a person seated thereunder, means for inflating first one of said belt portions and then inflating the other into overlapping relationship therewith, said means for inflating being actuated by the weight of a person to be confined within said belt, means on the overlapping portion for positively engaging said first inflated portion, and manually operated means for disengaging said portions to permit release of a person confined thereby and retraction of said belt portion by said biasing means.

7. A seat belt as set forth in claim 3 in which said means for fastening the free end of said belt is a buckle.

8. A seat belt buckle having a body with two movable sides normally biased toward the buckle body, said movable sides having a plurality of irregularities on their inner sides, a slider disposed between inwardly projecting flanges on said movable sides, said slider being biased rearwardly, pneumatic means for moving said slider forward against its rearward biasing, a trigger that prevents complete forward movement of said slider, means for disengaging said trigger thereby allowing complete forward movement of said slider, said complete forward movement of said slider completely removing said slider from its disposition between said inwardly projecting flanges on said movable sides thereby allowing said biasing of sides to move said sides towards said buckle body, said irregularities being adapted to engage a plurality of reciprocally shaped irregularities disposed upon the non-buckle end of a seat belt.

9. The belt buckle of claim 8 further comprising digital pressure-operated means for disengaging said irregularities on said movable sides from said reciprocally shaped irregularities, said digital pressure-operated means including a cover plate on said buckle, a slider disposed beneath a hole in said cover plate through which the said slider can be depressed by digital pressure against upward biasing thereof, thereby allowing said rearward biasing of said slider to move said slider rearwardly and underneath said inwardly projecting flanges on said movable buckle sides, an inwardly projecting tooth securely fastened to each of said sides beneath said flange thereon, said tooth and flange being vertically separated from each other by approximately half the thickness of said slider, each of the said teeth having a diagonally cut inner end matching a diagonally cut corner on the inner end of the underside of said slider, said diagonally cut corner on said slider being cut from the underside to approximately half the thickness of the slider towards the top side thereof leaving a square cut ear on the inner end of said top side, the beforementioned movement of said slider rearwardly and underneath the inwardly projecting flange causing each of said square cut ears to go between a tooth and a flange while the matching diagonal cuts on said teeth and slider cause the sides of the buckle to move outward from the buckle body, thereby disengaging said irregularities on the sides from said reciprocally shaped irregularities disposed upon the non-buckle end of a seat belt.

10. The belt buckle of claim 8 further comprising means for positively locking said buckle after said irregularities on said sides have engaged said reciprocally shaped irregularities on the non-buckle end of a seat belt.

References Cited
UNITED STATES PATENTS

| | | | |
|---|---|---|---|
| 3,172,166 | 3/1965 | Imbrecht | 52—2 |
| 3,190,694 | 6/1965 | Isaac | 297—388 |
| 3,300,910 | 1/1967 | Isaac | 52—2 |
| 3,314,719 | 4/1967 | Johnson | 297—385 |

CASMIR A. NUNBERG, *Primary Examiner.*